United States Patent [19]

Jones, Jr.

[11] 4,129,324
[45] Dec. 12, 1978

[54] TUBE COUPLING

[76] Inventor: Earl O. Jones, Jr., 1424 S. Evergreen Ave., Clearwater, Fla. 33516

[21] Appl. No.: 803,215

[22] Filed: Jun. 3, 1977

[51] Int. Cl.² ............................................. F16L 17/00
[52] U.S. Cl. .................................. 285/107; 285/423; 285/306; 138/40; 138/44; 138/45
[58] Field of Search .................... 285/83, 96, 97, 100, 285/102, 107, 109, 306; 138/40, 44, 45

[56] References Cited

U.S. PATENT DOCUMENTS

| | | | |
|---|---|---|---|
| 2,329,490 | 9/1943 | Smith | 285/306 X |
| 2,788,231 | 4/1957 | Crow | 285/107 |
| 2,804,318 | 8/1957 | Wiltse | 285/109 |
| 3,033,594 | 5/1962 | Cushman | 285/97 |

FOREIGN PATENT DOCUMENTS 246967 11/1960 Australia ................................. 285/109

*Primary Examiner*—Werner H. Schroeder
*Assistant Examiner*—C. J. Arbes
*Attorney, Agent, or Firm*—Stein & Frijouf

[57] ABSTRACT

The fluid coupling apparatus is disclosed which is adapted for connecting and disconnecting a first and a second fluid carrying member. Male and female coupling members are connected to the first and second fluid carrying members respectively. The female coupling member comprises a female internal orifice having a female radially enlarged portion in the female internal orifice of the female coupling member. The male coupling member frictionally and sealingly engages portions of the female coupling member for temporarily securing the male coupling member to the female coupling member. Flexible means is established in at least a portion of the male coupling member for radially expanding into the female radially enlarged portion upon application of fluid pressure to connect the male coupling member to the female coupling member. The foregoing abstract is merely a resume of one general application, is not a complete discussion of all principles of operation or applications, and is not to be construed as a limitation on the scope of the claimed subject matter.

8 Claims, 10 Drawing Figures

TUBE COUPLING

BACKGROUND OF THE INVENTION

1. Field of the Invention

This invention relates to pipe joints or couplings and more particularly to deformable couplings outwardly expanded or bulged, with fluid pressure seals within expansible chamber means.

2. Description of the Prior Art

Various types of fluid couplings have been known to the prior art. One group of fluid couplings relates to quick connect or quick disconnect fluid couplings wherein a rapid connection can be accomplished between a male and a female coupling member. In many cases, the quick disconnect fittings incorporated slots in one of the coupling members cooperating with pins in the other of the coupling members for securing the coupling members. Other quick disconnect fittings incorporated male and female screw threads in the male and the female coupling member.

The quick connect coupling apparati of the prior art have found widespread use in expensive hydraulic and fluid carrying equipment since the couplings were generally intended to carry a high pressure fluid and were manufactured at a substantial cost. Fine tolerances were required for sealing the prior art quick connect and quick disconnect fluid coupling apparati thus eliminating the applicability thereof to many common uses of fluid carrying members. Accordingly, quick disconnect fluid coupling apparati have not obtained widespread common use in applications such as garden hoses, low pressure liquid or gas distribution systems, or the like. The prior art has failed to provide a simple, inexpensive and reliable quick connect and quick disconnect fluid coupling designed for low pressure application with either liquid fluid or gas fluid.

Therefore it is an object of this invention to provide an apparatus which overcomes the aforementioned inadequacies of the prior art devices and provides an improvement which is a significant contribution to the advancement of the coupling art.

Another object of this invention is to provide a fluid coupling apparatus adapted for connecting and disconnecting a first and a second fluid carrying member incorporating a male and female coupling member with flexible means in the male coupling member for radially expanding into a radially enlarged portion of the female member upon application of fluid pressure to connect the male coupling member to the female coupling member.

Another object of this invention is to provide a fluid coupling apparatus adapted for connecting and disconnecting a first and a second fluid carrying member wherein the flexible means in the male coupling member is biased for radially contracting from the radially expanded position within the female radially enlarged portion upon termination of fluid pressure to enable disconnection of the male coupling member from the female coupling member.

Another object of this invention is to provide a fluid coupling apparatus adapted for connecting and disconnecting a first and a second fluid carrying member wherein the male coupling member frictionally and sealingly engages portions of the female coupling member upon insertion therein for temporarily securing the male coupling member to the female coupling member during radial expansion of flexible means upon application of fluid pressure.

Another object of this invention is to provide a fluid coupling apparatus adapted for connecting and disconnecting a first and a second fluid carrying member which may be economically and reliably produced for low fluid pressure applications.

Other objects and a fuller understanding of this invention may be had by referring to the summary of the invention, the detailed description and the claims, taken in conjunction with the accompanying drawings.

SUMMARY OF THE INVENTION

The invention may be incorporated into a fluid coupling apparatus adapted for connecting and disconnecting a first and a second fluid carrying member comprising a male and a female coupling member adapted for connection to the first and the second fluid carrying member respectively. The female coupling member has a female internal orifice comprising a female radially enlarged portion incorporated in the female internal orifice of the female coupling member. The male coupling member is insertable into the female internal orifice. Flexible means is established in at least a portion of the male coupling member for radially expanding into the female radially enlarged portion upon application of fluid pressure to connect the male coupling member to the female coupling member.

In a more specific embodiment of the invention, the flexible means may include resilient wall means being movable between a contracted and a radially expanded position. The flexible means may include a resilient conduit portion of the male coupling member extending from a terminal end thereof. The flexible means may include a resilient rubber conduit. A resilient conduit in this example is normally biased in the contracted position to radially expand only upon application of fluid pressure. The flexible means is biased for radially contracting from the radially expanded position within the female radially enlarged portion upon termination of fluid pressure to enable disconnection of the male coupling member from the the female coupling member.

More specifically the female coupling member may include a first and a second conduit portion having a first and a second cross-sectional area, respectively. The female radially enlarged portion is interposed between the first and second conduit portions with the female enlarged portion having a third cross-sectional area. The female radially enlarged portion may appear as a bulge in the conduit between the first and the second conduit portions. In the preferred example of the instant invention, stop means is incorporated into one of the coupling members for positioning the flexible means relative to the female radially enlarged portion upon insertion of the male coupling member into the female internal orifice. The male coupling member frictionally engages the female coupling member upon insertion therein. Concomitantly, a portion of the flexible means creates a fluid tight seal with a portion of the female internal orifice thereby enabling radial expansion of the flexible means upon application of fluid pressure. In one example, the frictional and sealing engagements are established on opposite ends of the female radially enlarged portion to temporarily secure the male coupling member to the female coupling member during the radial expansion of the flexible means by the applied fluid pressure.

This invention accordingly comprises an apparatus possessing the features, properties, and the relation of elements which will be exemplified in the apparatus hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
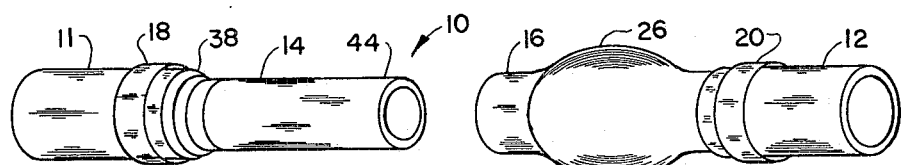
FIG. 1 is an elevational view of the preferred embodiment of the invention showing a female and a male coupling member for securing a first and a second fluid carrying member.

FIG. 1 is a elevational view of a fluid coupling apparatus 10 for connecting and disconnecting a first and a second fluid carrying member 11 and 12. The fluid carrying members 11 and 12 are shown as conventional garden hoses but it is understood that any type of fluid carrying member may be incorporated with the instant apparatus. A male and a female coupling member 14 and 16 are adapted for connection to the first and second fluid carrying members 11 and 12 by clamps 18 and 20 respectively.

FIGS. 2-6 are side sectional views of the male and female coupling members 14 and 16 in a series illustrating the interconnection between the male and female coupling members 14 and 16 upon application of fluid pressure. The female coupling member 16 includes a first and a second conduit portion 22 and 24 having a first and a second cross-sectional area 22A and 24A respectively. In this embodiment, the first and second conduit portions 22 and 24 are shown having a substantially identical cross-sectional area. The second conduit portion 24 is received within an internal orifice of the second fluid coupling member 12 and is secured by the clamp 20 as well known in the art. A female radially enlarged portion 26 is interposed between the first and second conduit portions 22 and 24 with a portion of the female radially enlarged portion having a third cross-sectional area 26A. In this embodiment, the third cross-sectional area 26A is substantially greater than the first and the second cross-sectional areas 24A and 26A resulting in the female radially enlarged portion 26 appearing as a bulge in the conduit between the first and second conduit portions 22 and 24. The female coupling member 16 may be constructed of a unitary rigid plastic material as shown or equivalent material with the female radially enlarged portion 26 being integrally formed in the female coupling member 16. A serrated outer surface 28 may be located on the outer surface of the female coupling member 16 for aiding in the seal with the second fluid coupling member 12. However, it should be understood that a smooth outer surface may also be incorporated with the instant invention. A flair 30 in the internal orifice of the female coupling member 16 facilitates fluid flow between the female coupling member 16 and the second fluid carrying member 12.

The male coupling member 14 includes a base section 32 having a serrated outer surface 34 receivable in an internal orifice of the first fluid carrying member 11. Clamp 18 secures the first fluid carrying member 11 to the male fluid coupling member 14. A flair 36 in the base section 32 facilitates fluid flow between the male coupling member 14 and the first fluid carrying member 11. The base section 32 includes a stop 38 which is shown as a raised bead integrally formed with the base section 32. However, it should be understood that the stop 38 may be a separate element secured to the base section 32 or secured to the female coupling member 16. Stop 38 may have a dual function by providing a stop to the first fluid carrying member 11 in addition to providing a stop for the female coupling member 16 as shown in FIGS. 3-6. It should also be understood that the terminal end 40 of the first fluid carrying member 11 may be used as a stop when the raised stop 38 is not incorporated in the base section 32.

Base section 32 includes an internal orifice recess 42 for receiving flexible means 44 shown as a resilient conduit secured to the recess 42 and secured to a shoulder 46 of the base section 32. The flexible means 44 may be secured to recess 42 and shoulder 46 by adhesive means or an internal metallic band (not shown) or any equivalent means. The base section 32 includes a tapered end 48 resulting in the outer surface 50 of the flexible means 44 being commensurate with the internal cross-sectional area of the first and second conduit portions 22 and 24. A region 52 of reduced wall thickness enables flexing of the tapered end 48 relative to the serrated outer surface 34 of the base section 32. The base section 32 may be constructed of a substantially rigid plastic material or the like whereas the flexible means 44 may be made of a radially expandable rubber, plastic or similar material.

It should be understood that the male and female coupling members 14 and 16 may be an integral unit with the first and second fluid carrying members 11 and 12.

Figure 2:
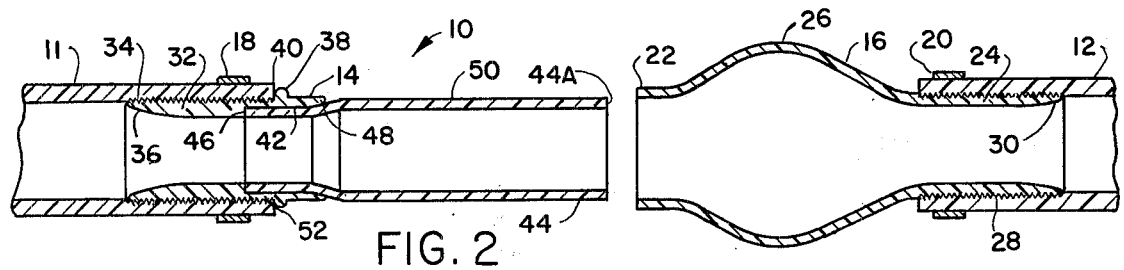
FIG. 2 is a side sectional view of the fluid coupling apparatus shown in FIG. 1.

FIG. 2 shows the male and female coupling members 14 and 16 separated from one another with the male coupling member 14 oriented for insertion within the female coupling member 16.

Figure 3:
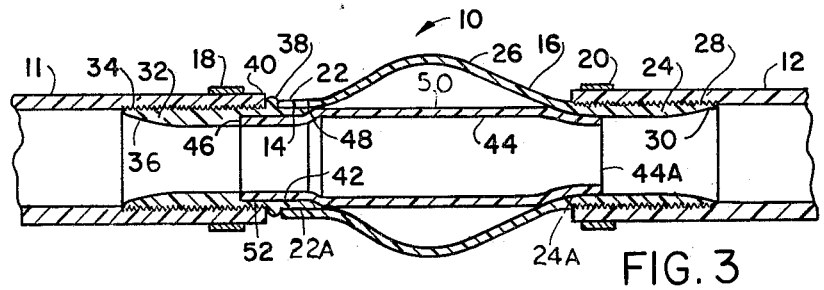
FIG. 3 is a side sectional view of the fluid coupling apparatus shown in FIGS. 1-2 with the male coupling member inserted within a female internal orifice of the female coupling member.

FIG. 3 shows the male coupling member 14 inserted within the internal orifice of the female coupling member 16 with stop 38 positioning the flexible means 44 relative to the radially enlarged portion 26 of the female coupling member 16. Insertion of male coupling member 14 provides a frictional engagement between tapered end 48 and the internal orifice 22A of the first conduit portion 22 of the female coupling member 16. The resilience established by the reduced thickness region 52 provides pressure for frictionally engaging the inner orifice 22A of conduit portion 22. The terminal end 44A of the flexible means 44 forms a seal with the internal orifice 24A of the second conduit portion 24. Accordingly, insertion of the male coupling member 14 into the female coupling member 16 provides a frictional engagement in the first conduit portion 22 and a fluid sealing engagement in the second conduit portion 24 for temporarily securing the male coupling member 14 to the female coupling member 16.

In certain applications, the frictional engagement may be replaced or supplemented by other conventional coupling devices such as pins, slots, threads or the like.

Figure 4:
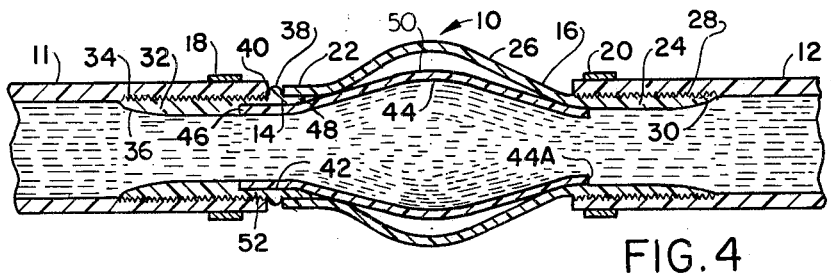
FIG. 4 is a side sectional view of the fluid coupling apparatus shown in FIGS. 1-3 with flexible means of the male coupling member being partially radially expanded by the application of the fluid pressure.

FIG. 4 shows the effect of the application of fluid pressure in the fluid carrying members 11 and 12. The fluid pressure radially expands the flexible means 44 within the female radially enlarged portion 26 during the temporary frictional and sealing engagements in the first and second conduit portions 22 and 24. The terminal end 44A of the flexible means 44 moves to the left in FIG. 4 relative to FIG. 3 during radial expansion while maintaining a fluid tight seal.

Figure 5:
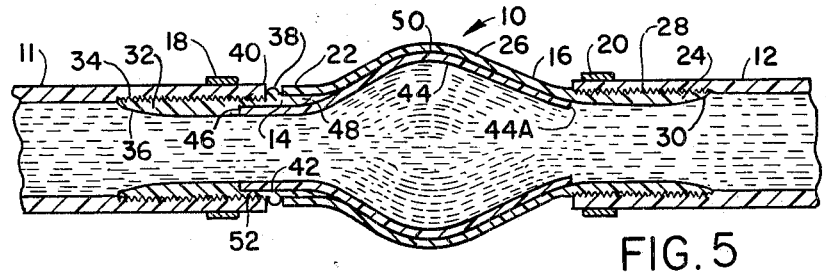
FIG. 5 is a side sectional view of the fluid coupling apparatus shown in FIGS. 1-4 with the flexible means of the male coupling member being fully radially expanded into engagement with a female radially enlarged portion of the female coupling member.

FIG. 5 illustrates the apparatus 10 with the flexible means 44 fully radially expanded into the contact with substantially all of the internal area of the female radially enlarged portion 26. The radially enlarged flexible means 44 forms a secure connection between the male coupling member 14 and the female coupling member 16. The temporary frictional and sealing engagements in conduit portions 22 and 24 are no longer required.

Figure 6:
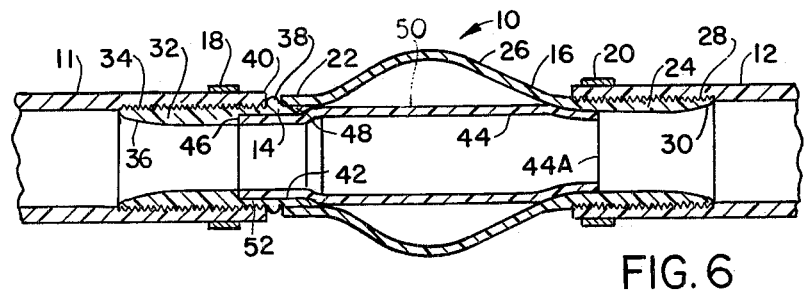
FIG. 6 is a side sectional view of the fluid coupling apparatus shown in FIGS. 1-5 with the flexible means being radially contracted to the original position shown in FIG. 3, upon termination of fluid pressure enabling disconnection of the male coupling member from the female coupling member.

FIG. 6 illustrates the termination of fluid pressure in the fluid carrying members 11 and 12. The flexible means 44 contracts from the radially expanded position to enable disconnection of the male coupling member 14 from the female coupling member 16. The flexible means 44 is biased to return to the contracted (normal position as shown in FIGS. 2, 3 and 6) and returns thereto upon termination of fluid pressure. The frictional engagement between tapered end 48 and the first conduit portion 22 maintains the relative position between male coupling member 14 and female coupling member 16 upon termination of the fluid pressure. The seal between the terminal end 44A of the flexible means 44 and the second conduit portion 24 is still maintained. Consequently, if fluid pressure is again applied in fluid carrying members 11 and 12 the flexible means 44 will again radially expand as shown in FIGS. 4 and 5 to reseal the apparatus. The male coupling member 14 may be disconnected from the female coupling member 16 by terminating the fluid pressure as shown in FIG. 6 and mechanically separating the coupling members 14 and 16.

It should be appreciated that the instant invention results in a simple and effective apparatus for connecting low pressure fluids in a quick connect and quick disconnect coupling. The coupling is essentially incapable of separation after the flexible means 44 has been radially expanded into the female radially enlarged portion 26 by the application of fluid pressure. The male and female couplings 14 and 16 cannot be disconnected or separated as long as fluid pressure is present within the fluid carrying members 11 and 12. Only upon termination of the fluid pressure can the male and female coupling members 14 and 16 be separated by mechanical means. This safety feature is of substantial importance when used with corrosive or dangerous fluids.

FIGS. 7–10 are side sectional views of a second embodiment of a fluid coupling 110 comprising of male and female coupling members 114 and 116 in a series illustrating the interconnection between the male and female coupling members 114 and 116 upon application of fluid pressure. This second fluid coupling 110 is substantially similar to the coupling 10 and similar parts will be labeled with similar reference indicia. The female coupling member 116 includes a first and a second conduit portion 122 and 124 having first and second substantially identical cross-sectional areas 122A and 124A respectively. A female radially enlarged portion 126 is interposed between the first and second conduit portions 122 and 124 with a third cross-sectional area being substantially greater than the first and the second cross-sectional areas 122A and 124A.

The male coupling member 114 includes a base section 132 receivable in the internal orifice of the first fluid carrying member 11. The base section 132 includes a stop 38 which may have a dual function by providing a stop to the first fluid carrying member 11 in addition to providing a stop for the female coupling member 116 as shown in FIGS. 7–10.

Base section 132 includes an internal orifice recess 142 for receiving flexible means 144 shown as a resilient conduit secured to the recess 142 and a shoulder 146 of the base section 132. The flexible means 144 may be secured to the recess 142 and the shoulder 146 by adhesive means or an internal metallic band (not shown) or any equivalent means. The flexible means 144 includes an aperture 151 at the terminal end 144A of the flexible means 144 which has a cross-sectional area substantially less than the internal cross-sectional area of the first and second conduit portions 122 and 124. A region 152 of reduced wall thickness enables flexing of a portion of base 132 relative to the serrated outer surface 34 of the base section 132. The base section 132 may be constructed of a substantially rigid plastic material or the like whereas the flexible means 144 may be made of a radially expandable rubber, plastic or similar material.

Figure 7:
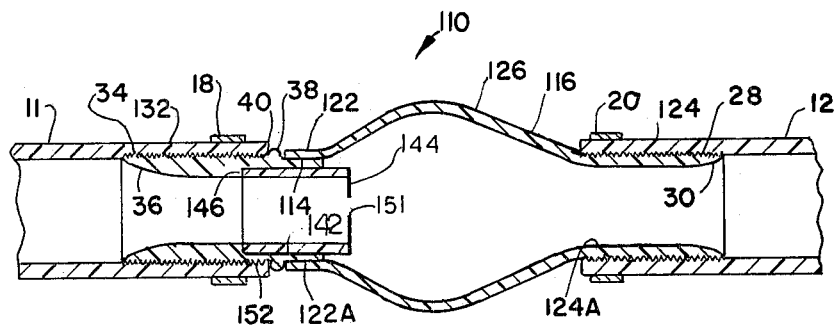
FIG. 7 is a side sectional view of a modification of the fluid coupling shown in FIGS. 1-6 with the male coupling member within the female internal orifice of the female coupling member.

FIG. 7 shows the male coupling member 114 inserted within and frictionally engaging the internal orifice of the female coupling member 116 with stop 38 positioning the flexible means 144 relative to the radially enlarged portion 126 of the female coupling member 116. The resilience established by the reduced thickness region 152 provides pressure for frictionally engaging the inner orifice 122A of conduit portion 122.

Figure 8:
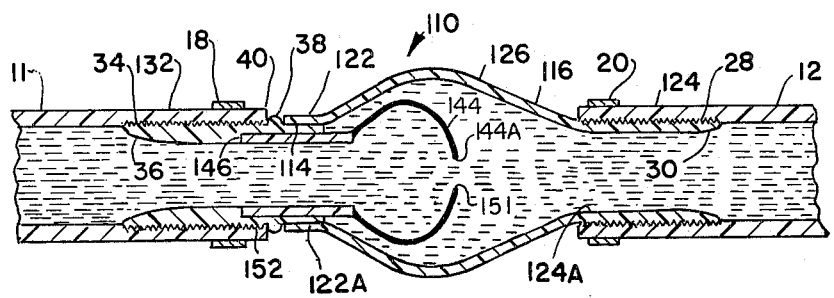
FIG. 8 is a side sectional view of the fluid coupling apparatus shown in FIG. 7 with the flexible means of the male coupling member being partially radially expanded by the application of fluid pressure.

FIG. 8 shows the effect of the application of fluid pressure in the fluid carrying members 11 and 12. The fluid pressure radially expands the flexible means 144 within the female radially enlarged portion 126.

Figure 9:
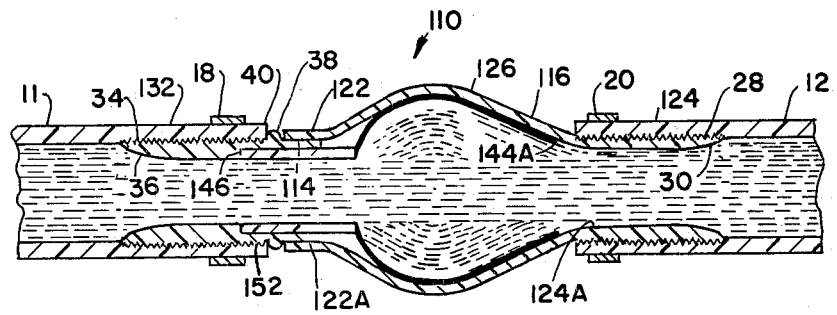
FIG. 9 is a side sectional view of the fluid coupling apparatus shown in FIGS. 6-8 with the flexible means of the male coupling member being fully radially expanded into engagement with the female radially enlarged portion of the female coupling member.

FIG. 9 illustrates the apparatus 110 with the flexible means 144 fully radially expanded into the contact with a portion of the internal area of the female radially enlarged portion 126. The radially enlarged flexible means 144 forms a secure connection between the male coupling member 114 and the female coupling member 116.

Figure 10:
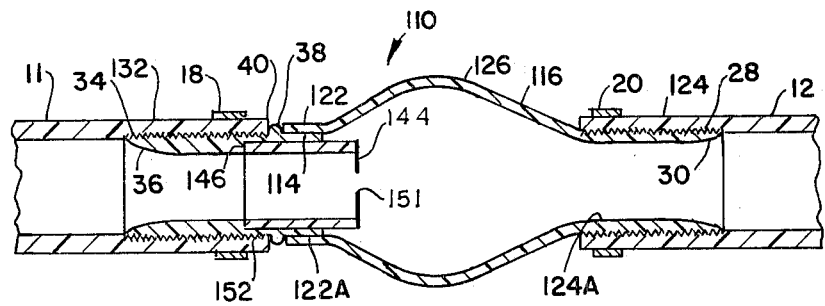
FIG. 10 is a side sectional view of the fluid coupling apparatus shown in FIGS. 6-9 with the flexible means being radially contracted to the original position shown in FIG. 7 upon termination of fluid pressure enabling disconnection of the male coupling member from the female coupling member.

FIG. 10 illustrates the termination of fluid pressure in the fluid carrying members 11 and 12. The flexible means 144 contracts from the radially expanded position to enable disconnection of the male coupling member 114 from the female coupling member 116. The frictional engagement maintains the relative position between male coupling member 114 and female coupling member 116 upon termination of the fluid pressure. Consequently, if fluid pressure is again applied in fluid carrying members 11 and 12 the flexible means 144 will again radially expand as shown in FIGS. 8 and 9 to reseal the apparatus.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

Now that the invention has been described:
What is claimed is:

1. A fluid coupling apparatus adapted for connecting and disconnecting a first and a second fluid carrying member, comprising in combination:
    a male and a female coupling member adapted for connection to the first and the second fluid carrying member respectively;
    said female coupling member comprising a first and a second conduit portion having a first and second cross-sectional area respectively;
    a female radially enlarged portion including a bulge interposed between said first and second conduit portions;
    said second conduit portion of said female coupling member being receivable within an internal orifice of said second fluid carrying member;
    said male coupling member comprising a rigid base section having a portion thereof receivable within an internal orifice of said first fluid carrying member;
    said base section having a recess for receiving a flexible conduit means;
    said flexible conduit means radially expanding into said female radially enlarged portion upon application of fluid pressure to connect said male coupling member to said female coupling member;
    said flexible conduit means comprising resilient wall means being movable between a contracted and a radially expanded position; and
    said resilient wall means being normally biased in the contracted position to radially expand only upon application of fluid pressure and to radially contract from said radially expanded position within said female radially enlarged portion upon termination of fluid pressure to enable disconnection of said male coupling member from said female coupling member.

2. An apparatus as set forth in claim 1, including stop means in one of said coupling members for positioning said flexible means relative to said female radially enlarged portion upon insertion of said male coupling member into said female internal orifice.

3. An apparatus as set forth in claim 1, wherein said male coupling member frictionally engages said female coupling member upon insertion therein thereby enabling radial expansion of said flexible means upon application of fluid pressure.

4. An apparatus as set forth in claim 1, wherein a portion of said flexible means creates a fluid tight seal with a portion of said female internal orifice upon insertion of said male coupling member into said female coupling member.

5. An apparatus as set forth in claim 1, wherein said male coupling member frictionally engages one portion of said female coupling member upon insertion therein;
    said male coupling member sealing engages another portion of said female coupling member upon insertion therein; and
    said frictional and sealing engagements temporarily securing said male coupling member to said female coupling member during the radial expansion of said flexible means by the applied fluid pressure.

6. An apparatus as set forth in claim 5, wherein said frictional and sealing engagements are established on opposite ends of said female radially enlarged portions.

7. An apparatus as set forth in claim 1, wherein said flexible means includes a resilient rubber conduit.

8. A fluid coupling apparatus adapted for connecting and disconnecting a first and a second fluid carrying member, comprising in combination:
    a male and a female coupling member adapted for connection to the first and the second fluid carrying member respectively;
    said female coupling member having a female internal orifice;
    a female radially enlarged portion in said female internal orifice of said female coupling member;
    said male coupling member being insertable into said female internal orifice;
    flexible means in at least a portion of said male coupling member for radially expanding into said female radially enlarged portion upon application of fluid pressure to connect said male coupling member to said female coupling member;
    said flexible means comprising resilient wall means being movable between a contracted and a radially expanded position;
    said resilient wall means being normally biased in the contracted position to radially expand only upon application of fluid pressure and to radially contract from said radially expanded position within said female radially enlarged portion upon termination of fluid pressure to enable disconnection of said male coupling member from said female coupling member; and
    said contracted position of said resilient wall means being disposed transverse to the flow of fluid through the first and second fluid carrying members and having an aperture therein substantially smaller than said female internal orifice.

* * * * *